Dec. 13, 1960   E. F. KLENKE, JR   2,964,532
PRODUCTION OF PIGMENTS
Filed April 17, 1957
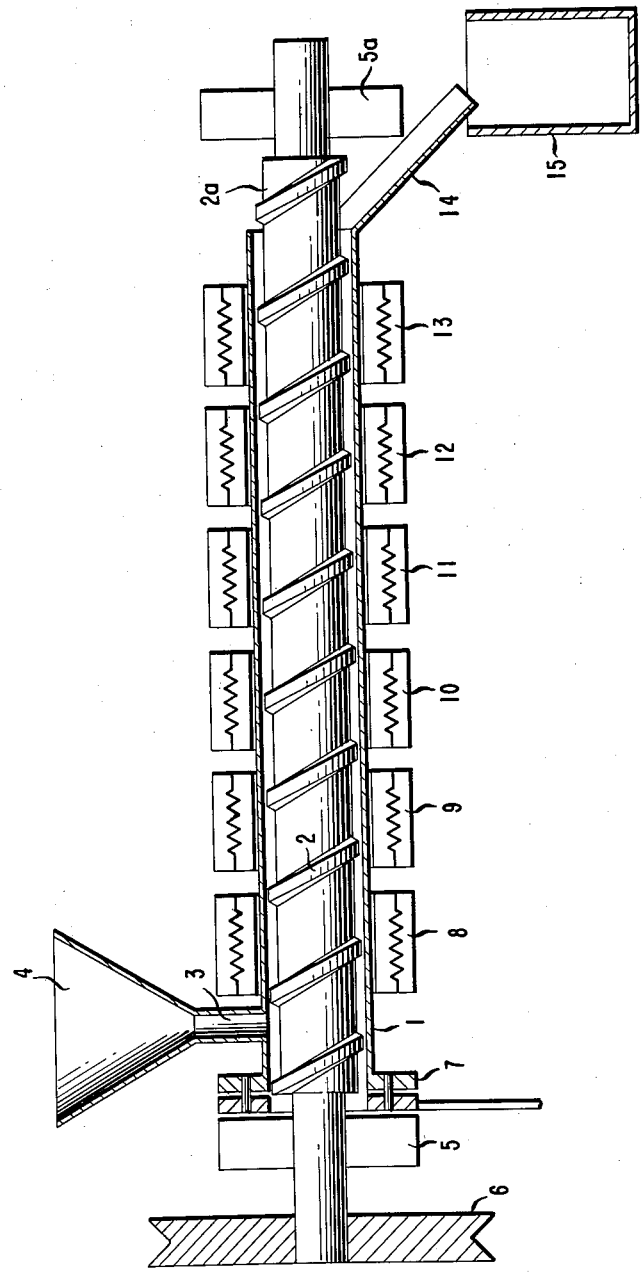
INVENTOR
EDWARD F. KLENKE, JR.
BY Francis J. Crowley
ATTORNEY

United States Patent Office 2,964,532
Patented Dec. 13, 1960

2,964,532

PRODUCTION OF PIGMENTS

Edward F. Klenke, Jr., Summit, N.J., assignor to E. I. du Pont de Nemours and Company, Wilmington, Del., a corporation of Delaware Filed Apr. 17, 1957, Ser. No. 653,477

10 Claims. (Cl. 260—314.5)

This invention relates to a method of manufacturing phthalocyanine compounds.

There are two well known processes for the preparation of phthalocyanine compounds. In one process, a mixture of phthalic anhydride, urea and a metal compound, such as copper chloride (or the powdered metal itself, such as copper powder) and a suitable catalyst are heated at temperatures in the order of 200° C. In the other process, phthalonitrile is heated with a metal or a metal salt at temperatures in the range of 180° C. to 250° C.

In the phthalic anhydride-urea process, if the appropriate ingredients are thoroughly mixed and heated together, the reaction mass fuses, giving off volatile by-products and going through a very frothy plastic stage before it finally sets up to a porous solid which has a very marked tendency to adhere to the surface of the equipment in which the reaction takes place. From the standpoint of a chemical reaction, this is an attractive process, and many attempts have been made to operate it on a commercial scale. When carried out in the laboratory by heating small batches of the mixed dry reactants in a suitable container in an oven, the reaction proceeds readily to a product of excellent quality in acceptable yields, approximately 80–90% of theory. However, when this process is operated on a larger scale, a number of difficulties appear. For instance, there is a tendency for some separation of the ingredients in the absence of agitation, and the yields become markedly reduced. Furthermore, the tendency to foam during the heating cycle results in a porous mass with poor heat transfer so that the interior of the mass is at a markedly different temperature from the periphery which is close to the source of heat, resulting in low yields and poor quality. Finally, agitation of the reaction mass does not solve the problem because it ultimately becomes impossible to stir the mixture when it sets up to the solid state. This may result in a non-uniform reaction mass, which sticks to the vessel and the agitator, thus posing problems in the discharge of the reaction vessel.

As a result of these serious difficulties in the operation of this process, the industry has turned to an alternative, wherein a suitable liquid diluent is added to the mixture. The use of a liquid diluent makes it possible to have effective heat transfer and excellent agitation, and the final product is obtained in suspension in this liquid diluent. Separation of the product and the diluent is accomplished by conventional means, such as filtration, steam distillation, or the like. Such a process has been operated widely in the industry and has given good yields and excellent products. However, the necessity for recovering the relatively large amounts of organic liquid adds significantly to the cost of the manufacture of the phthalocyanine. Consequently, a method by which the simple fusion process could be operated economically would be of great practical importance.

Turning now to the phthalonitrile process, when a mixture of phthalonitrile and a metal salt, such as cupric chloride, is heated, a vigorous exothermic reaction takes place, and the temperature, unless carefully controlled, may frequently rise above the point of most efficient reaction. Some decomposition takes place at these high temperatures with resulting low yields and the product tends to be unattractive in color in comparison to products made under careful control. Under ideal laboratory conditions, this difficulty can be minimized, and products of excellent quality can be prepared in high yield. Processes of this sort have been operated commercially, but still leave much to be desired in ease of control. As in the case of the phthalic anhydride-urea process, the common manner of controlling the reaction in the phthalonitrile process involves operating in the presence of suitable diluent liquids; but the same problems of storing and handling the liquid, the making up of the inevitable losses, and the extensive problems of removal of the liquid and recovery for reuse have added materially to the cost of such processes. Consequently, in this process also, it is highly desirable to develop means of carrying out the reaction without the use of the liquid diluent.

In both of these reactions for the manufacture of phthalocyanine pigments, there is a significant problem in the selection of suitable materials of construction. Since both reactions can be carried out with the free metal as a reactant, it is obvious that the use of metal containers for this reaction may result in serious corrosion of the equipment, and the unwanted metal phthalocyanine thus formed will contaminate the desired product. For this reason, large scale operations have been carried out in nickel equipment where the corrosion is relatively small and the small amount of nickel phthalocyanine formed therein can usually be tolerated without serious adverse effect on the quality of the product being made. Nevertheless, this is not an attractive solution to the problem.

It is the principal object of this invention to provide a novel process for carrying out fusion reactions in the manufacture of phthalocyanines. It is a further object of this invention to manufacture phthalocyanine products by a fusion reaction of phthalocyanine-forming ingredients in a continuous reactor. More particularly, it is an object of this invention to provide a novel and practical process for the manufacture of copper phthalocyanine by a fushion reaction between phthalic anhydride, urea and a copper salt, such as copper chloride, in the presence of a suitable catalyst, such as ammonium molybdate. Furthermore, it is an object of this invention to provide a novel and practical process for preparing phthalocyanine pigments by a fusion reaction between phthalonitrile and suitable metals or metal compounds, such as a copper chloride.

The objects of this invention are achieved by a process for the manufacture of a phthalocyanine which comprises passing a thin layer of premixed reactants at reaction temperature between and in contact with the inner surface of a cylinder and the surface of a screw rotating within said cylinder. The thickness of the layer may range from about ¼ inch to ½ inch, and it is controlled by the size of the shaft on the screw rotated within the cylinder. An oversize shaft which has a clearance of about ¼ inch to ½ inch between it and the wall of the cylinder will keep the reactants at the proper thickness. The maintenance of this thin layer is essential to the conduct of the invention and a thickness of about ¼ inch is preferred. The thickness of the layer as specified above is, of course, subject to the tolerance allowed in the manufacture of the screw and tube, and such tolerances are usually + or −$\frac{1}{16}$ of an inch. It is also essential that the surfaces between which the reaction is conducted be smooth, corrosion-resistant surfaces which have a low coefficient of friction with the product formed. Glass enamel surfaces are especially suitable for this purpose.

The premixed reactants which form the thin layer may be generally referred to as a mixture of phthalocyanine-forming reactants. Such a mixture may comprise a phthalic acid or its derivatives; as a second component, urea or its derivatives such as biuret or the like; and as a third component, a metal or an inorganic metal salt which furnishes the metal for metal-containing phthalocyanines. A catalyst is usually included as part of this mixture of phthalocyanine-forming reactants. Ammonium molybdate is a preferred catalyst. As is apparent from the preceding portion of the specification, phthalo-nitrile and also its nuclear-substituted derivatives may be used to form phthalocyanine. In this latter instance where there is nitrogen in the ring compound, it is not necessary to use urea or its derivatives. Included in the derivatives of phthalic acid which may be used in this invention are the anhydride, the ammonium salt, the amides, the imide, imino phthalimidine and amino-imino-isoindolenine, as well as their nuclear substituted derivatives, such as the mono or poly sulfonated or halogenated phthalic acids. Examples of metals and their inorganic salts include copper, cupric chloride, cuprous chloride, a copper pyridinium chloride complex, nickel, the nickel chlorides, aluminum, aluminum chloride, and the like. Other metals and metal salts are also disclosed in Example IX. Moreover, a mixture of phthalo-cyanine-forming reactants includes mixtures such as that shown in Example VIII which result in the formation of metal-free phthalocyanines.

In one embodiment of this invention, suitable amounts of phthalic anhydride, urea, cupric chloride and ammonium molybdate, are thoroughly mixed in dry powdered form and then passed at reaction temperature between the inner surface of a cylinder and the surface of a screw rotating within said cylinder.

In another embodiment, a suitable mixture of phthalonitrile and a desired metal compound, such as cupric chloride or a copper pyridinium chloride complex, may be reacted in the same manner as described above. In each case, the inclusion of an inert solid diluent, such as sodium chloride or titanium dioxide, offers advantages in ease of control. The amount of this solid diluent included is not critical, but optimum results are obtained with about 0.5 to 4 parts of diluent solid per part of phthalocyanine to be formed (calculated on a 100% yield).

In this invention, the reactor may comprise a screw as shown in Figure 1 coated with a glass enamel surface and having approximately a two-inch flight 2 with a two-inch pitch. This screw has an oversize shaft 2a about one and a half inches in diameter to give a flight depth of approximately a quarter inch. Surrounding this screw conveyer is a cylinder 1 forty-eight inches long which is coated on the interior wall with glass enamel. The inside diameter of cylinder 1 is just slightly larger than the flight so as to permit the latter to turn freely. The cylinder is held stationary by flange assembly 7, and near the end from which the screw is feeding when rotating there is hopper 4 and feed tube 3 for adding the reacting materials through a side opening in the cylinder. The cylinder is arranged for external heating, this being ideally taken care of by electrical heating units (8 through 13 in Figure 1) completely surrounding the cylinder. There should also be means for controlling the degree of heating, and in the case of electrical heating units, this is easily accomplished by the use of variable voltage transformers. It is preferred that there be several separate heating units so that the heating can be separately controlled at various points through the length of the reaction tube. The screw is supported by a suitable bearing 5 at the driven end and also another bearing 5a at the discharge end, or this end may be allowed to float freely through the remainder of the reaction tube.

The screw is driven by a positive driving means 6 which is preferably provided with a variable speed control (not shown). Although this reactor may resemble conventional extruding devices, it differs from them in that there is no restriction on the discharge end of the tube, and the reacted materials fall freely from this open end on to chute 14 and into the container 15. Likewise, any gases formed during the reaction may be discharged easily through this open end. Furthermore, close clearances between screw and tube are unnecessary.

In one method of making copper phthalocyanine, a mixture of approximately 4 mols phthalic anhydride, 12 mols of urea, 1 mol of cupric chloride (anhydrous), and .05 mol of ammonium molybdate are pulverized together and thoroughly mixed in the form of a dry powder. This powder may be prepared in relatively large quantities and stored for use. The reactor described above is set up for rotation at approximately two revolutions per minute, and the heating units are energized so that the material fed into the reactor will be raised in temperature from the ambient temperature to approximately 200° C. in the first minute of residence within the reactor or within about 4" of the entering point. The temperature throughout the remainder of the reactor is maintained at approximately 200° C., and with rotation at 2 revolutions per minute, the total residence time in the reactor will be approximately 12 minutes. The product is discharged from this reactor as a porous solid in small pieces having somewhat the shape of the reaction space within the cylinder. The reaction may be carried out continuously for an indefinite period of time with the dry ingredients being fed into one end of the reactor and the crude phthalocyanine pigment being discharged from the other end of the reactor.

The crude copper phthalocyanine resulting from this procedure requires purification and particle size reduction, which may be done in any conventional manner. In one preferred process, this dry material may be charged to a ball mill with sodium chloride and a small amount of a chlorinated hydrocarbon (according to the disclosure of U.S. Patent 2,556,730), and after a suitable grinding cycle, the pigment is extracted with dilute acid to give a relatively pure phthalocyanine pigment in paste form which may be dried and pulverized to give a highly desirable commercial product. On the other hand, this product may be chlorinated before purification to give polychloro copper phthalocyanine, which is a desirable green pigment.

In an alternative and somewhat preferred procedure for synthesizing phthalocyanine, approximately 3 parts of crystalline sodium chloride is added to each part of the active reaction mixture, and the procedure is carried out substantially as described above. This addition of an inert, solid diluent offers the advantage of having a reaction mixture which becomes less pasty and less inclined to stick to the screw during its passage through the plastic stage of the fusion process. It has the disadvantage of reducing the capacity of the reaction vessel and is preferred only because it creates a more favorable set of conditions within the reactor.

In another desirable procedure for the preparation of copper phthalocyanine pigments, approximately 4 mols of phthalonitrile and 1 mol of anhydrous cupric chloride are thoroughly mixed in dry form with about 1 part of sodium chloride per part of phthalonitrile. This reaction mixture is then fed into the apparatus described above under the same conditions, but with the speed of rotation increased to approximately 5 to 8 revolutions per minute in order to give a retention time in the reactor of approximately 4½ to 3 minutes. The reaction of phthalonitrile with cupric chloride is much more rapid than that of phthalic anhydride and urea with cupric chloride, so that this relatively short retention time is adequate for the completion of the reaction. As in the previous case, the crude product resulting from this reaction requires further purification and particle size reduction to be acceptable as a pigmentary product, and this may be done, as in the previous case, by any conventional procedure. Since this product already contains some sodium chloride, it is convenient to add additional sodium chloride to make a total of approximately 10 parts of sodium chloride per part of pigment and to grind the mixture in a ball mill in dry form after the manner of U.S. Patent 2,402,167. After the grinding operation, the salt is removed by solution in an aqueous medium, preferably in dilute acid, and the pigment is isolated by conventional filtration, washing, and drying. An Alternative process for reducing particle size is the acetone milling process of U.S. Patent 2,556,727.

The following examples set forth the invention in detail, but they are not intended as a limitation thereof.

EXAMPLE I

The following ingredients for a phthalocyanine synthesis were separately pulverized and then thoroughly mixed with crystalline sodium chloride in the indicated proportions:

Phthalic anhydride _____ 266 parts (1.8 mols).
Urea _____ 387 parts (6.45 mols).
$CuCl_2$ (anhydrous) _____ 61 parts (0.45 mol).
Ammonium molybdate _____ 2.5 parts (0.13 mol).
Crystalline sodium chloride ____ 716 parts.

The apparatus used is shown in Figure 1. In starting operations, it is convenient to charge crystalline sodium chloride into feed hopper 4 and to rotate the screw until the reaction space throughout the tube is substantially full. The heaters are then energized and adjusted so that thermocouples placed in contact with the tube between the several heaters show temperatures of about 220° C. The screw is then started at a continuous speed of about 2 revolutions per minute and the previously prepared mix of ingredients is continuously charged through feed tube 3 from feed hopper 4. The salt initially introduced into the tube is displaced by the reacting components and, after an appropriate interval of about 12 minutes, the colored phthalocyanine composition is discharged from the tube over the chute 14 into container 15. By adjustment of the current in the heating elements, the temperature of the reactants is maintained within the range of about 200° C.–220° C., and at the rate of 2 r.p.m., the retention time at this temperature is about 12 minutes. After stable conditions are achieved, the mixture of ingredients can be fed continuously and the crude pigment, mixed with sodium chloride, is continuously discharged from the tube. To determine the yield, a fractional part of the total product is pulverized and extracted at the boil with a dilute solution (about 5%) of sulfuric acid, filtered, washed free of salts, dried, and weighed. The amount of material recovered disclosed that 266 parts of phthalic anhydride gives about 189 parts of pure (chlorine free) copper phthalocyanine (73% of theoretical yield).

The crude product requires particle size reduction and purification to have acceptable properties as a pigment. The following procedures illustrate how this may be accomplished.

Procedure "A"

A ball mill of about 60 gallons total volume is charged with about 1000 lbs. of "Cyl Pebs" (cylindrical bars of iron about ½" in diameter and about 1" long) together with about 100 lbs. of common nails (20d size). 40 lbs. of dry sodium chloride is then added, followed by 18 lbs. of the crude mixture of copper phthalocyanine and salt obtained from the fusion process described above, and finally by 1.6 lbs. of tetrachloroethylene. The mill is closed tightly and rotated at about 70% of the critical speed for about 48 hours. (Critical speed is the speed at which the grinding elements are just carried around with the mill by centrifugal force.) The dry powder is then discharged from the mill and wet up with dilute (about 5%) sulfuric acid to a total volume of about 50 gallons. After heating to the boil and boiling for about an hour, the slurry is filtered, washed free of soluble salts, and dried at about 80° C. The product is a greenish-blue copper phthalocyanine pigment in the beta crystal phase. It is of good tinctorial strength and excellent intensity of hue and compares favorably in every way with similar products made by the prior art synthesis methods in solvents such as kerosene, trichlorbenzene, etc.

Procedure "B"

The process of Procedure "A" is repeated except that the tetrachloroethylene is omitted. The resulting product after isolation is a red shade copper phthalocyanine, in the alpha crystal form, of excellent strength and tinctorial properties but subject to crystal growth and conversion to the beta phase when exposed to crystallizing solvents, such as the aromatic or chlorinated hydrocarbons.

EXAMPLE II

The following ingredients were separately pulverized and then thoroughly mixed with crystalline sodium chloride in the indicated proportions:

Phthalic anhydride _____ 221 parts (1.5 mols).
4-chloro phthalic acid _____ 61 parts (0.30 mol).
Urea _____ 387 parts (6.45 mols).
$CuCl_2$ (anhydrous) _____ 61 parts (0.45 mol).
Ammonium molybdate _____ 2.5 parts (0.13 mol).
Crystalline sodium chloride ____ 716 parts.

This mixture was charged to the reactor shown in Example I in the manner therein described except that the speed of rotation of the screw was about 1.5 r.p.m. thus giving a retention time of about 16 minutes. The product after isolation contains about 4% chlorine, and it is stabilized in the alpha crystal phase. When the particle size reduction is carried out by salt milling as shown in Procedure "B" of Example I, the product is a typical red shade copper phthalocyanine in the alpha crystal phase which is not changed by exposure to crystallizing solvents.

EXAMPLE III 292 parts (2.3 mols) of phthalonitrile and 80.3 parts (0.6 mol) of anhydrous $CuCl_2$ (pulverized) are thoroughly mixed with 292 parts of crystalline sodium chloride (0.84 part of salt per part of phthalocyanine to be formed calculated on a 100% yield). A reactor similar to that shown in Figure 1 but equipped with 8 smaller heating units is filled with salt as described in Example I and the external temperature of the tube under the first 3 units on the feed end is adjusted to about 200° C. with the remaining units not heated. The above mixture is then fed continuously to the reactor with the screw operating at about 5 r.p.m. to give a retention time of about 4½ minutes. The reaction between phthalonitrile and copper chloride is exothermic in nature and the temperature in the reaction zone increases rather sharply and then tends to drop off as the reaction is completed in the zone which is not being heated. On the other hand, the introduction of the cold material reduces the temperature slightly in the feed end of the reactor. The final equilibrium temperature profile is shown in the following table:

| Zone | Temperature Range | |
|---|---|---|
| | External, °C. | Internal, °C. |
| Heater: | | |
| #1 | 175–180 | |
| #2 | 225–227 | |
| #3 | 237–239 | |
| #4 | 210–211 | |
| #5 | 200–203 | |
| #6 | 172–175 | 210–215 |
| #7 | 145–147 | 200–210 |

The temperature inside the screw near the discharge end is about 210–215° C. Thus, there is a rather rapid heating to the reaction temperature which should be controlled at a maximum external temperature of about 240° C. (and not over 250° C.). Without adding more heat, there is a gradual temperature reduction, but an internal temperature of not less than about 200° C. is maintained throughout the remainder of the reactor. A mixture of a monochloro copper phthalocyanine and salt is discharged from the reactor. About 290 parts monochloro copper phthalocyanine is obtained from the 292 parts of phthalonitrile (corresponding to about 83% of theoretical yield).

The product requires particle size reduction, and this may be done without prior purification. A ball mill of about 60 gallons total capacity is charged with about 1200 lbs. of steel shot of about 1/8" diameter. 30 lbs. of the crude mixture of pigment and salt is charged to the mill followed by about 140 lbs. of acetone. The mill is then rotated at 70% of the critical speed for about 48 hours and the slurry of pigment, salt, and acetone is discharged from the mill which is preferably flushed with additional acetone. The acetone is removed by steam distillation and can be recovered in a suitable purity for reuse by distilling through a proper rectifying column. The aqueous pigment suspension is further heated with dilute acid (5% $H_2SO_4$), filtered, washed free of soluble salts and dried to give a highly desirable blue monochloro copper phthalocyanine of good strength and intensity.

EXAMPLE IV

The following ingredients are thoroughly mixed:

Phthalonitrile _____ 2692 parts (21 mols).
$CuCl_2$ (anhydrous) (pulverized) _____ 282 parts (2.1 mols).
$Cu_2Cl_2$ (anhydrous) (pulverized) _____ 334 parts (3.37 mols as CuCl).
Crystalline sodium chloride___ 2692 parts.

This mixture is fed to the reactor as described in Example III operating at about 5 r.p.m. to give a retention time of about 4½ minutes. The temperature is adjusted to give a maximum external temperature of about 240° C. at the end of the third heater. The product, after extraction, is obtained in about 84% of theoretical yield and contains about 3.9% chlorine which indicates that somewhat more than half of the molecules contain one chlorine atom.

Particle size reduction is done in a two step operation wherein 116 lbs. of the crude pigment is charged to a 60 gallon ball mill containing 100 lbs. of "Cyl Pebs," milled for about 4 hours and discharged in dry form. 53 lbs. of this dry, partially milled product is then charged to a 60 gallon mill containing 1000 lbs. of 1/8" steel shot together with 140 lbs. of acetone and milled 12 hours. The slurry of pigment in acetone is discharged from the mill, and the product isolated as in Example III to give a typical alpha phase copper phthalocyanine pigment of good strength and intensity which is completely stable on exposure to crystallizing solvents.

EXAMPLE V

Prior to the reaction with phthalonitrile, a copper pyridinium complex is prepared by mixing 725 parts (5.4 mols) of $CuCl_2$ (anhydrous) and 105 parts (1.06 mols) of pyridine. The resulting solid complex is pulverized and mixed with 2637 parts (20.6 mols) of phthalonitrile and 2637 parts of sodium chloride. This mixture is passed through the reactor of Example III with a retention time of about 4 minutes, and a midpoint internal temperature of about 250° C. The resulting product, after particle size reduction and extraction as shown in Example IV, is obtained in a normal yield of about 83–85%, and it has two distinguishing characteristics. First, the chlorine content is about 4.5% to 5.5% which is somewhat less than would be expected when $CuCl_2$ is used in the absence of pyridine; and secondly, the product is substantially free from the tendency to "flocculate" in coating composition vehicles.

EXAMPLE VI 1920 parts (15 mols) of phthalonitrile is mixed with 240 parts (3.8 mols) of copper powder, 3840 parts of sodium chloride and 40 parts of ammonium chloride, and the mixture is passed through the reactor of Example III with a retention time of about 12 minutes and a maximum temperature of about 215° C. The resulting product is a substantially chlorine-free copper phthalocyanine. The particle size reduction may be carried out as in Procedure "A" of Example I to give a green shade, beta phase product of good crystal stability in solvents. Alternatively, the method of Procedure "B" of Example I may be used to give a strong, red shade alpha phase copper phthalocyanine which is subject to crystallization in solvents.

EXAMPLE VII

The following ingredients are separately pulverized and then thoroughly mixed:

Phthalic anhydride _____ 28 parts (0.19 mol).
Urea _____ 40.7 parts (0.68 mol).
$CuCl_2$ anhydrous _____ 6.5 parts (0.05 mol).
Ammonium molybdate _____ 0.27 part (0.01 mol).
Titanium dioxide — pigment grade _____ 36.5 parts.

This mixture of ingredients is charged continuously to the reactor of Figure 1 with a retention time of about 20 minutes and a uniform temperature of about 200° C. The product discharged from the reactor is a mixture of copper phthalocyanine and titanium dioxide. When pulverized, it exhibits good pigment strength without further particle size reduction. It may be extracted with boiling water to remove by-products of the reaction and unreacted raw materials, but it requires no further treatment.

EXAMPLE VIII

To make a metal-free phthalocyanine, the following materials are thoroughly mixed:

| | Parts |
|---|---|
| Phthalonitrile | 100 |
| Calcium oxide | 3 |
| Sodium chloride | 200 |
| Methyl glucamine | 6 |

The production of metal-free phthalocyanines is described in U.S. Patent 2,413,191, and the above mixture of materials is according to this patent. The mixture is passed through the reactor of Example III with a retention time of about 12 minutes. The temperature of the first heater is set at about 160° C. and the remainder of the heaters are adjusted so that the temperature remains in the range of about 210° C.–220° C. The product discharged is essentially a mixture of metal-free phthalocyanine and common salt. Particle size reduction may be brought about by dissolving the product in about 8 times its weight of 96% sulfuric acid at about 20° C. and then drowning this solution in cold water. After isolation by filtering, washing and drying, a greenish-blue, metal-free phthalocyanine of excellent pigmentary properties is obtained. If the particle size reduction is done by milling with salt in the presence of a chlorinated hydrocarbon as in Procedure "A" of Example I, a much greener shade of blue is obtained, and the product is a beta-phase metal-free phthalocyanine.

EXAMPLE IX

The reaction of phthalonitrile with metal salts other than copper is well known and may be carried out following the general process of Example III, but using the following amounts of the several metal salts in place of 80.3 parts of CuCl$_2$ used in that example:

| | Parts |
|---|---|
| NiCl$_2$ anhydrous | 77 |
| CoCl$_2$ | 78 |
| SnCl$_2$ | 113 |
| AlCl$_3$ | 80 |
| FeCl$_3$ | 97 |

The metal phthalocyanines obtained from the above metal salts are typical of the prior art phthalocyanines of these metals. In general, the reactions do not introduce chlorine into the molecule, as in the case of cupric chloride, although the aluminum, tin and iron complexes as formed contain ionic chlorine atoms, attached to the metals, which are readily hydrolyzed to hydroxyl groups.

EXAMPLE X

The process of Example III is repeated with two runs except that the amount of sodium chloride in the mixture is varied.

*Run No. 1.*—The mixture of ingredients comprises:

| | Parts |
|---|---|
| Phthalonitrile | 292 |
| CuCl$_2$ anhydrous | 80.3 |
| Sodium chloride | 146 |

This mixture is fed to the reactor as in Example III.

*Run No. 2.*—The mixture of ingredients comprises:

| | Parts |
|---|---|
| Phthalonitrile | 294 |
| CuCl$_2$ anhydrous | 80.3 |

For the mixture of Run No. 2 the retention time is increased somewhat by operating the screw at about 3 r.p.m., and careful control of the temperature is required in order to keep the reactor below about 240° C.

In each case, a typical monochloro copper phthalocyanine is obtained after suitable particle size reduction and extraction of impurities.

EXAMPLE XI

This invention is equally applicable to the preparation of substituted phthalocyanines by the use of substituted intermediates in place of the unsubstituted phthalic anhydride or phthalonitrile. Thus in Example I, the 266 parts of phthalic anhydride may be replaced by any of the following:

514 parts tetrachlorophthalic anhydride to give a polychloro copper phthalocyanine 435 parts 4-phenyl phthalic acid to give a tetraphenyl copper phthalocyanine which is a green of attractive hue 345 parts 4-nitro phthalimide to give tetra nitro copper phthalocyanine 378 parts trimellitic acid to give tetra carboxy copper phthalocyanine The examples shown above point out clearly that this process is applicable to the manufacture of substantially all phthalocyanine products including the commercially important copper phthalocyanine, which may be substituted in a variety of ways, metal-free phthalocyanine and other metal phthalocyanines in general. It is also applicable to mixtures of substituted and unsubstituted derivatives which impart special properties to the product. For instance, the replacement of a small amount of the phthalic anhydride in Example II with 4-sulfophthalic acid yields a product containing both chlorine, which imparts crystal stability, and the sulfonic acid group which imparts resistance to flocculation in coating compositions. These compounds are all made by essentially the same chemical processes, the difference in the case of the various metal compounds being solely concerned with the choice of the metal salt which is used in forming the complex. In the case of the substituted phthalocyanines, the use of appropriately substituted intermediates is the controlling factor.

It is desirable at this point to call attention to the various forms of copper phthalocyanine which may be obtained by the various processes which are prescribed in detail in the preceding examples. It is well recognized in the art that the reaction of phthalic anhydride and urea with a copper salt gives a substantially chlorine-free copper phthalocyanine which may exist in either of two crystal phases depending upon the conditions under which it is finished. There has been some confusion in the art with respect to the terminology applied to these two different forms of copper phthalocyanine, but the terminology used in in this disclosure is that found in FIAT Report 1313, vol. 3, page 447, and in U.S. Patent 2,556,726, wherein the relatively reddish-blue obtained ordinarily by acid pasting of the pigment is called the "alpha" form, and the relatively greenish-blue obtained by particle size reduction in the presence of certain crystallizing solvents is named the "beta" form.

The chlorine-free copper phthalocyanine obtained by the fusion reaction of phthalic anhydride-urea and a copper chloride is substantially 100% in the beta form, but it is relatively large in particle size and requires particle size reduction to have effective pigmentary properties. If this particle size reduction is done by the well-established acid pasting process of the prior art on phthalocyanine pigments, the product is converted substantially all to the alpha form. Likewise, particle size reduction by salt milling results in the alpha form. On the other hand, if the particle size reduction is carried out by salt milling in the presence of crystallizing solvents as shown in U.S. Patents 2,556,728 and 2,556,730 or by ball milling in solvents such as acetone after the manner of U.S. Patent 2,556,726 or, even by milling under certain conditions in water, the crystals are retained in the beta phase and reduced in particle size to give a product which has a desirable greenish hue and which is stable in the presence of crystallizing solvents. Hence, this invention can be used to make either form of pigment, depending upon the choice of the method for particle size reduction. If a portion of the phthalic anhydride is replaced by 4-chlorophthalic acid, the product contains chlorine in the molecule. When the amount of chlorine is about 3% or more (preferably 4–4.5%), the product is stabilized in the red shade alpha crystal phase, regardless of the method of particle size reduction.

In the case of synthesis from phthalonitrile, the situation is somewhat more complicated in that it is difficult to obtain a chlorine-free product if a copper chloride is used as the source of the copper. Ordinarily, the use of cuprous chloride gives a product which contains about half of the amount of chlorine theoretically required for a monochloro copper phthalocyanine. This product will be largely in the alpha phase at the end of the synthesis and will be retained substantially in the alpha phase regardless of the method of particle size reduction used. The degree of chlorination will vary somewhat with the temperature of reaction, and under some conditions it is possible to obtain products which contain a relatively small amount of chlorine and which are partially converted to the beta phase when the particle size reduction is carried out under conditions favoring this conversion. If, however, cupric chloride is used as the source of the copper, the reaction product will be more or less completely a monochloro copper phthalocyanine and will be completely stable in the alpha form regardless of the method of particle size reduction. It is obvious from the above discussion that it is possible to obtain a copper phthalocyanine pigment in any desired crystal form by the proper selection of conditions of synthesis and conditions of particle size reduction.

As pointed out in the early part of this specification there are two processes which have received wide attention in the manufacture of phthalocyanine products. Both have been used commercially and their importance depends largely upon the availability and the relative costs of the appropriate raw materials. In the one process, simple derivatives of phthalic acid are used together with substantial amounts of urea and the appropriate metal salt. The derivative of phthalic acid most commonly used is the very readily available phthalic anhydride.

When urea is heated to the temperatures employed in this process, it is known to decompose with the formation of biuret, cyanuric acid and the like. Hence, these products, especially biuret, may be used in place of the equivalent quantity of urea. From a chemical standpoint, the use of biuret may have some advantages, but generally speaking, the advantages do not offset the higher cost of the biuret.

The process using phthalic anhydride and urea is endothermic, and therefore requires the addition of heat to maintain the reaction. Since it is relatively easy to control the amount of heat added to a reactor such as that should in Figure 1, there is no difficulty in operating the process of this invention on the phthalic anhydride-urea route at any previously determined temperature condition. In the heating zone of the reactor, the materials first become molten and then react relatively slowly to give the somewhat pasty mixture which finally solidifies before it is discharged from the reactor. It is preferred that this molten condition be achieved rather rapidly and that the temperature be maintained at a fairly uniform level in the general vicinity of 200° C. through the remainder of the reactor tube.

In the second process widly used in the manufacture of phthalocyanines, the reactants are the dinitrile of phthalic acid, commonly called phthalonitrile, or derivatives thereof and the appropriate metal compound. For the simple copper phthalocyanine of commerce, the reactant of choice in this synthesis is phthalonitrile, but it is equally possible to use substituted phthalonitriles. Compounds such as 1,2-dicyano-naphthalene and the like have also been used in this type of reaction. Generally speaking, the reactions between phthalonitrile and metal compounds are exothermic in character, and the control of temperature within the reactor becomes somewhat more difficult. As shown in Example III, it seems desirable that the temperature in the initial portion of the tube be maintained somewhat below the optimum reaction temperature and that the material be heated rather rapidly to a temperature in the range of 200° C., at which point the exothermic character of the reaction will carry it on up to temperatures in the range of 240° C. It is highly desirable that the temperature be controlled so that the maximum of about 240°-250° C. is not exceeded. Since the reaction itself results in heat, it does not usually become necessary to add heat beyond about the first third of the length of the reactor tube. The exact means by which the desired control of temperature is achieved is not a part of this invention, but it seems to be important that the conditions suggested above be adhered to rather closely in obtaining optimum results.

The particular choice of the metal salt used in this manufacture of phthalocyanines is controlled to some extent by the availability of the compounds in question. Nearly all simple metal salts will undergo the reactions to prepare phthalocyanines, but the chlorides seem to be peculiarly effective in this operation. It is, of course, possible to use the powdered metal in the same reaction, although the reactions seem to proceed more readily with the salts.

Since the reactions which bring about the formation of phthalocyanines may be carried out using the free metal as the source of the metal in the complex, it is obvious that the use of simple metal reactors could result in the reaction of the metal of the reactor with the raw materials used. This has two adverse results. First, the phthalocyanine may be contaminated by a foreign metal phthalocyanine, and, secondly, the reactor itself may be slowly corroded away. Consequently, it is necessary to avoid direct contact of the reactants in phthalocyanine manufacture with metal containers during the reaction insofar as that is possible. There is also another factor which enters into this invention, and this is the ability of the plastic mass to be moved forward by the screw rather than simply rotating with the screw. This requires that there be some slipping of the reaction mass on the surface of the screw, and at the same time, there must be friction with the inner surface of the cylinder. When a plain metal screw is used, the plastic mass sticks thereto and the forward motion soon is very much reduced, if not completely stopped, and the reactor is no longer effective. This appears to be the case regardless of how well the surface may be polished. The use of a glass coating on both the screw and the cylinder, as heretofore described, has resulted in effective movement of the materials. It thus appears important that the surface of the screw be made of some material which has a relatively low coefficient of friction with the reaction mass. This seems to be ideally achieved by the simple glass enamel coating applied in the usual manner in the nature of a ceramic material which is fused by heat after application to the metal. However, it is not intended to restrict this invention to any particular form of glass enamel coating; but any material which will be inert at the reaction temperature have sufficient mechanical strength and adhesion to the metal to endure under the conditions of the operation and which has a sufficiently smooth surface to enable the reaction mass to slip forward during the rotation of the screw is effective.

The material of which the principal mass of the screw and the reactor tube is made is of no significance provided it has sufficient mechanical strength to endure the stresses involved in this reaction. The preferred material from the standpoint of cost is a simple iron or steel alloy which is selected for its freedom from excessive deformation during the heating cycle necessary for the application of the ceramic coating. On the other hand, it is possible that the screw be made wholly of a ceramic material. The length of the reactor is largely controlled by economic factors in which the speed of rotation and the necessary retention time for satisfactory reaction are the factors which control the output of the unit. Obviously, a longer unit can give a higher productivity with the same retention time. A counter-balancing factor is the torque necessary to force the material through the screw and an excessively long screw might cause difficulty in this respect. A length of 48 inches is a good compromise between the various factors, at least in reactors of small diameter. The diameter of the reactor tube is largely a matter of productivity, and any convenient size can be used. Reactors of 1" diameter have been used successfully with lengths as short as 24" and a larger reactor of 6" diameter by 48" long has also been successfully operated. In larger reactors with their necessarily heavier wall tubes and larger amounts of metal in the screw, the heat lag between the heaters and the interior and the ultimate accumulation of a reservoir of heat in the metal makes control of the temperature more difficult.

The manner in which the reactor tube is heated may obviously be accomplished in a variety of ways. The way shown in this proposal involves the use of a multiple series of electric heaters individually controlled. With a 48" tube it is desirable to use from 4 to 8 individual heaters closely spaced together, the larger number being preferable for better control. However, it would be entirely possible to achieve the desired control of heating by the use of a suitable heat transfer liquid passed through jacketed zones around the reactor tube.

The speed of rotation of the screw is, of course, dependent on the desired retention time within the heating zone. In contrast to the previously accepted view that the phthalocyanine reaction required a substantial period of time for completion, it has been found that when the reaction is carried out according to this invention, it is substantially complete in periods not exceeding 15 to 20 minutes. In the case of the phthalic anhydride-urea reaction, retention times are usually 4 to 12 minutes and may go up to as much as about 25 minutes to obtain optimum yield. This is quite surprising in view of the reaction times of approximately 4 hours which have been believed to be necessary for satisfactory reaction in the prior art processes in which inert solvents were used as diluents. In the case of the reactions with phthalonitrile, retention times ranging from 0.25 to 5 minutes have been successfully used to obtain good yields. It appears that the best yields require more than a minute, but the time need not exceed about 5 minutes in a phthalonitrile synthesis to obtain optimum yields. It is very unexpected that acceptable practical yields can be obtained even with retention times of 0.25 to 0.5 minute. Within the aforementioned limits, the optimum time for any particular type of reaction or conditions of reactions may be readily determined by simple experimentation.

Generally speaking, the reaction temperatures for the phthalocyanine syntheses are in the range of about 200° C.–250° C., and the optimum range is 200° C.–220° C. The necessary factors of control have been rather completely pointed out above.

This invention makes available a novel and practical process for the manufacture of phthalocyanine type products in relatively simple equipment requiring a modest investment. Furthermore, the elimination of the use of relatively large amounts of non-aqueous liquids as diluents eliminates the step of removing and recovering these liquids and thus reduces the cost of manufacture. Products of improved texture and improved flocculation resistence are more easily obtained by this process than by the commonly used processes in the prior art.

Since it is obvious that many changes and modifications can be made in the above-described details without departing from the nature and spirit of the invention, it is to be understood that the invention is not to be limited to said details except as set forth in the appended claims.

I claim:

1. In a process for the manufacture of a phthalocyanine by fusion synthesis of phthalocyanine-forming reactants, the improvement which comprises passing a thin layer of the premixed reactants about ¼ inch to ½ inch thick, at reaction temperature, between and in contact with a glass enamel inner surface of a cylinder and the glass enamel surface of a screw rotating within said cylinder, and recovering phthalocyanine from said cylinder at the opposite end from which the thin layer of reactants is introduced.

2. The process of claim 1 in which the thin layer of premixed reactants is about ¼ inch thick.

3. In a process for the manufacture of a phthalocyanine by fusion synthesis of phthalocyanine-forming reactants, the improvement which comprises passing at reaction temperature a thin layer of material, ¼ inch to ½ inch thick, of premixed reactants in admixture with an inert solid diluent between and in contact with a glass enamel inner surface of a cylinder and a glass enamel surface of a screw rotating within said cylinder and recovering phthalocyanine from said cylinder at the opposite end from which the thin layer of reactants is introduced.

4. In a process for the manufacture of a phthalocyanine by fusion synthesis of phthalocyanine-forming reactants, the improvement which comprises passing a thin layer of the premixed reactants about ¼ inch to ½ inch thick at a temperature of from about 200° C.–250° C. between and in contact with a glass enamel inner surface of a cylinder and the glass enamel surface of a screw rotating within said cylinder, and recovering phthalocyanine from said cylinder at the opposite end from which the thin layer of reactants is introduced.

5. In a process for the manufacture of a copper phthalocyanine by fusion synthesis of phthalic anhydride, urea and a copper chloride, the improvement which comprises passing a thin layer of the premixed reactants about ¼ inch to ½ inch thick at a temperature of from about 200° C.–250° C. between and in contact with a glass enamel inner surface of a cylinder and the glass enamel surface of a screw rotating within said cylinder, and recovering phthalocyanine from said cylinder at the opposite end from which the thin layer of reactants is introduced.

6. In a process for the manufacture of a copper phthalocyanine by fusion synthesis of phthalonitrile and a copper chloride, the improvement which comprises passing a thin layer of the premiexd reactants about ¼ inch to ½ inch thick at a temperature of from about 200° C.–250° C. between and in contact with a glass enamel inner surface of a cylinder and the glass enamel surface of a screw rotating within said cylinder, and recovering phthalocyanine from said cylinder at the opposite end from which the thin layer of reactants is introduced.

7. In a process for the manufacture of chlorinated copper phthalocyanine by fusion synthesis of phthalonitrile and cupric chloride, the improvement which comprises passing, at a temperature of 200° C.–220° C., a thin layer of material ¼ inch to ½ inch thick of premixed phthalonitrile and cupric chloride in admixture with sodium chloride as a solid inert diluent between and in contact with a glass enamel inner surface of a cylinder and a glass enamel surface of a screw rotating within said cylinder and recovering phthalocyanine from said cylinder at the opposite end from which the thin layer of materials is introduced.

8. In a process for the manufacture of a phthalocyanine by fusion synthesis of phthalocyanine-forming reactants, the improvement which comprises passing a thin layer of the premixed reactants about ¼ inch to ½ inch thick, at reaction temperature, between and in contact with the inner surface of a cylinder and the surface of a screw rotating within said cylinder, and recovering phthalocyanine from said cylinder at the opposite end from which the thin layer of reactants is introduced.

9. In a process for the manufacture of a copper phthalocyanine by fusion synthesis of phthalic anhydride urea and a copper chloride in the presence of ammonium molybdate as a catalyst, the improvement which comprises passing, at a temperature of 200° C.–250° C., a thin layer of material ¼ inch to ½ inch thick of premixed phthalic anhydride, urea, copper chloride and ammonium molybdate in admixture with sodium chloride as a solid inert diluent between and in contact with a glass enamel inner surface of a cylinder and a glass enamel surface of a screw rotating within said cylinder and recovering phthalocyanine from said cylinder at the opposite end from which the thin layer of materials is introduced.

10. A process for the manufacture of chlorinated copper phthalocyanine by fusion synthesis of phthalonitrile and a copper pyridinium complex obtained by reacting cupric chloride with pyridine in a molar ratio of 5 to 1, which comprises passing at a temperature of about 200° C.–250° C., a thin layer of material ¼ inch to ½ inch thick of premixed phthalonitrile and the copper pyridinium complex in admixture with sodium chloride as a solid inert diluent between and in contact with a glass enamel inner surface of a cylinder and a glass enamel surface of a screw rotating within said cylinder and recovering phthalocyanine from said cylinder at the opposite end from which the thin layer of materials is introduced.

References Cited in the file of this patent

UNITED STATES PATENTS

| | | |
|---|---|---|
| 1,904,548 | Schultze | Apr. 18, 1933 |
| 2,153,300 | Dahlen et al. | Apr. 4, 1939 |
| 2,194,250 | Turek | Mar. 19, 1940 |
| 2,214,477 | Riley | Sept. 10, 1940 |
| 2,364,456 | Lulek | Dec. 5, 1944 |
| 2,402,167 | Lang et al. | June 18, 1946 |
| 2,587,639 | Miley | Mar. 5, 1952 |

OTHER REFERENCES

F.I.A.T., Final Report No. 1313, vol. III, pp. 278–280 (1948).